(12) United States Patent
Kadlicko

(10) Patent No.: US 7,171,808 B2
(45) Date of Patent: Feb. 6, 2007

(54) HYDRAULIC POWER SUPPLY SYSTEM

(75) Inventor: George Kadlicko, Rockford, IL (US)

(73) Assignee: Haldex Hydraulics Corporation, Rockford, IL (US)

( * ) Notice: Subject to any disclaimer, the term of this patent is extended or adjusted under 35 U.S.C. 154(b) by 0 days.

(21) Appl. No.: 11/291,563

(22) Filed: Dec. 1, 2005

(65) Prior Publication Data

US 2006/0144042 A1   Jul. 6, 2006

Related U.S. Application Data

(60) Provisional application No. 60/632,177, filed on Dec. 1, 2004.

(51) Int. Cl.
*F01B 3/00*   (2006.01)

(52) U.S. Cl. .......................... 60/486; 91/503

(58) Field of Classification Search ................ 417/269, 417/426, 429; 91/472, 499, 503, 505; 60/486
See application file for complete search history.

(56) References Cited

U.S. PATENT DOCUMENTS

| | | | | |
|---|---|---|---|---|
| 3,190,075 A | * | 6/1965 | Ebert | 60/489 |
| 3,643,433 A | * | 2/1972 | Widmaier | 60/486 |
| 6,151,895 A | * | 11/2000 | Matsura | 60/490 |

* cited by examiner

*Primary Examiner*—Anthony D. Stashick
*Assistant Examiner*—Samuel E. Belt
(74) *Attorney, Agent, or Firm*—St. Onge Steward Johnston & Reens LLC

(57) ABSTRACT

Multiple hydraulic machines are located in a common housing. The swashplates are located in longitudinal bores and the barrels in transverse bores. Valve housings are located on either side to accommodate control valves and circuitry. The barrels are mechanically coupled by a gear train for conjoint rotation.

15 Claims, 3 Drawing Sheets

HYDRAULIC POWER SUPPLY SYSTEM

This application claims the benefit of, under Title 35, United States Code, Section 119 (e), U.S. Provisional Application No. 60/632,177 filed on Dec. 1, 2004.

FIELD OF THE INVENTION

The present invention relates to hydraulic power supply systems.

BACKGROUND OF THE INVENTION

The use of hydraulic systems to provide multiple consumers is well known. Typically, each consumer may utilise a separate circuit that is supplied from a common source of hydraulic power. However, in more sophisticated systems, multiple independent circuits are established, each with its own source of hydraulic power. The integration of such a system into a design envelope is of paramount concern to ensure that the resultant transmission is compact and does not inhibit the versatility of the device in which it is being used.

More sophisticated and versatile systems use variable capacity hydraulic machines and therefore require adjustment mechanisms and control circuits for the mechanisms. Higher horsepower systems will also use rotating machines with a rotating barrel and axially sliding pistons acting against a stationary swashplate. These machines therefore have a number of inter-relating components that are supported within a housing. The integration of several such machines requires the ability to connect the mechanical and hydraulic power supplies as well as the control functions while maintaining the structural integrity of the machine.

U.S. Pat. Nos. 4,132,278 and 4,129,192 to Todeschini show arrangements of hydraulic machines that are integrated in to the structural envelope of a vehicle. However, in these arrangements the machines are mounted within the overall structure as self contained units so that individual housings must provide the structural support for the components. This makes the overall envelope larger and increases the weight of the unit in which the machines are incorporated.

It is therefore an object of the present invention to provide an arrangement for multiple hydraulic sources that meets the above objectives.

BRIEF DESCRIPTION OF THE DRAWINGS

An embodiment of the invention will now be described by way of example only with reference to the accompanying drawings in which.

DETAILED DESCRIPTION OF THE INVENTION

Figure 1:
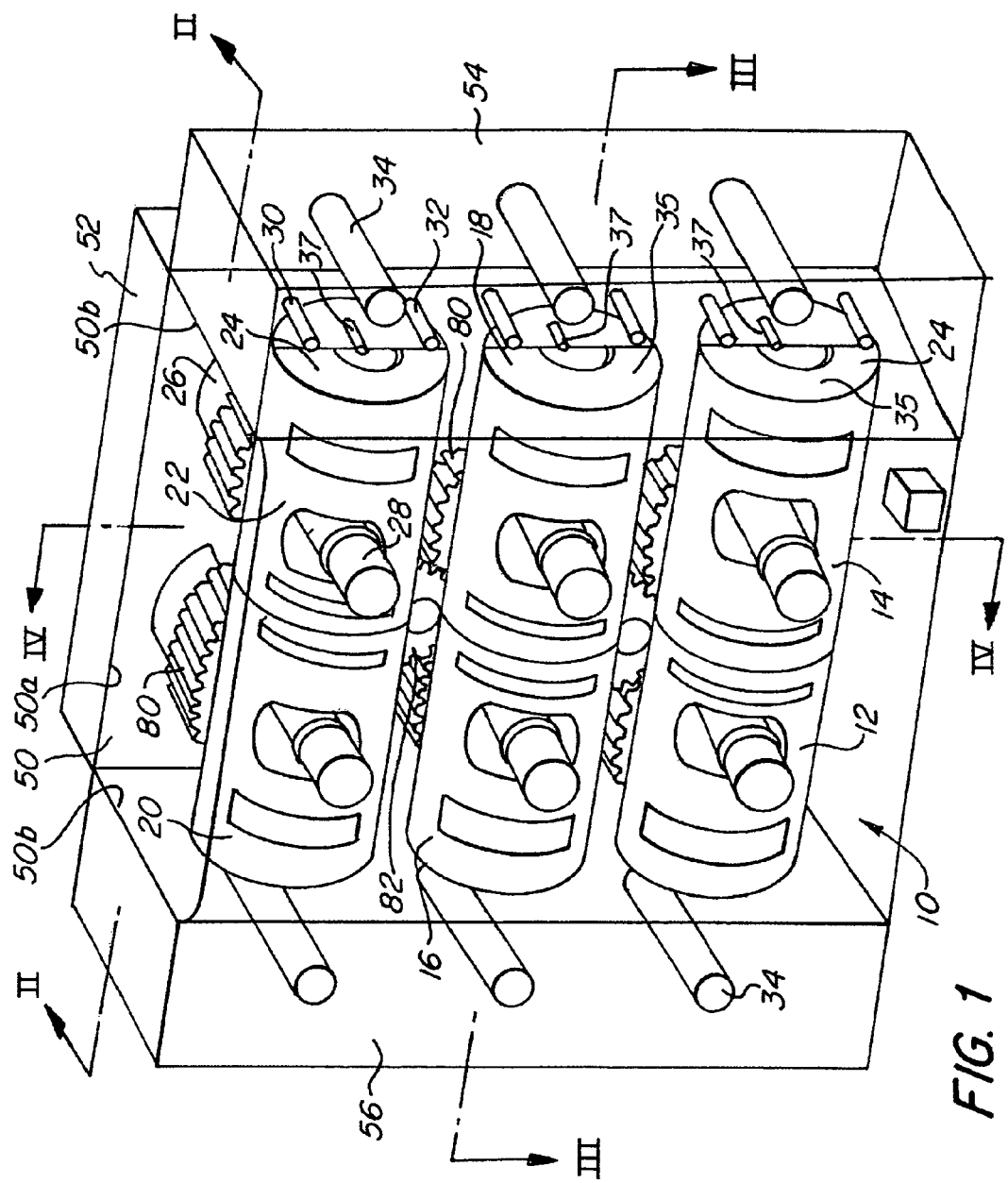
FIG. 1 is a perspective view of a hydraulic power supply.
Figure 2:
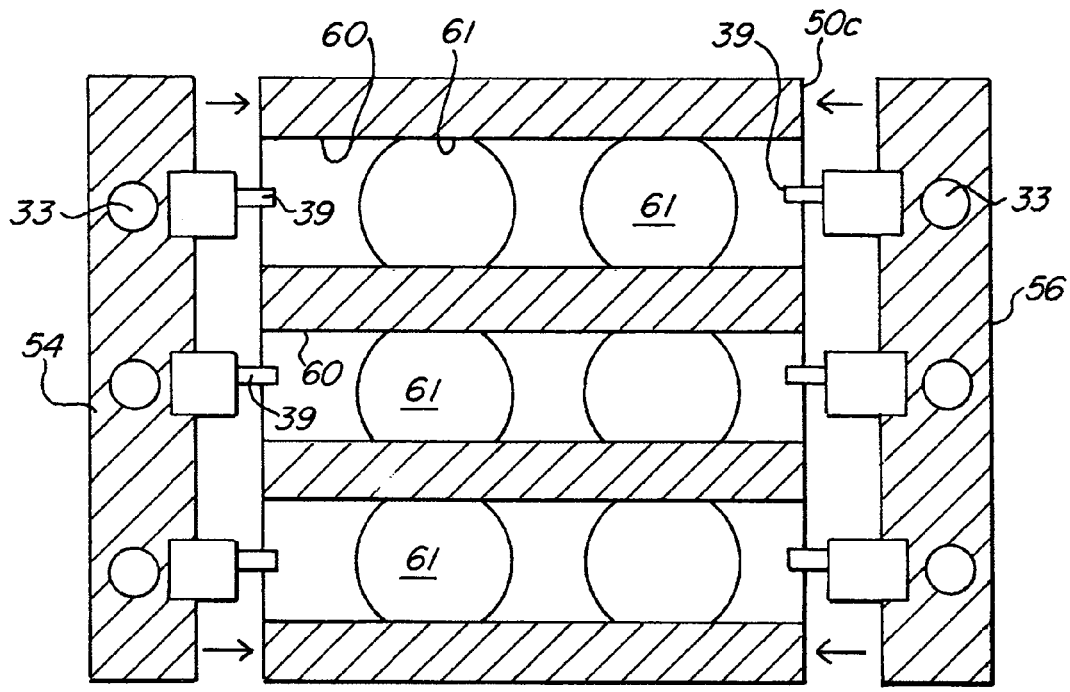
FIG. 2 is a view on the line II—II of FIG. 1.

Referring therefore to FIG. 1, a housing 10 contains a plurality of hydraulic machines 12, 14, 16, 18, 20, 22. Each of the machines is identical in construction and therefore only one will be described in detail. Each of the machines 12–22 includes a part cylindrical swashplate assembly 24 and a barrel assembly 26 containing reciprocating axial pistons. The barrel assembly 26 is mounted upon a shaft 28 for rotation relative to the swashplate and a port plate 29 (FIG. 2) that connects the barrel to intake and output ports. The inclination of the swashplate relative to the axis of rotation of the shaft determines the stroke of the pistons in the barrel assembly 26. A pair of adjustment motors 30, 32 act upon the swashplate assembly 24 to adjust the angular position under the control of a control valve 34.

Further details of the construction of this hydraulic machine may be found in a co-pending application Ser. No. 10/776,769, the contents of which are incorporated herein by reference. For the purpose of the present description it is sufficient to note that the motors 30, 32 bear on spaced locations of an upstanding projection 35 of the swashplate 24 and that measurement of displacement of the swashplate assembly 24 is obtained from a finger 37 that bears against the end face of the projection 35. The barrel 26 carries a toothed ring 80 that provides an pick up for a sensor 39 to measure rotation of the barrel 26.

The motors 30, 32 are single acting motors that include a piston slidable within a sleeve that includes porting to the interior of the sleeve.

In order to achieve a compact arrangement of machines, the housing 10 is arranged with a central body portion 50 having a rear face 50*a*, side faces 50*b* and a front face 50*c*. A sealing end plate 52 is located on the rear face 50*a* and valve blocks 54, 56 are located on opposite side faces 50*b* to accommodate control valves 34 and associated circuitry. The central body 50 also accommodates an accumulator assembly within a vertical bore 55 to provide a common supply of pressurised fluid to the control valves 34.

The central body 50 is provided with three parallel transverse bores 60 that extend between opposite sides faces of the body 50. The bores 60 are dimensioned to conform to the curvature of the swashplate 24 and provide a smooth bearing surface for the swashplate. The bores 60 may be machined in line from end to end, thereby enhancing the accuracy of the bearing surface and may incorporate a fluid bearing to support the swashplate 24

The transverse bores 60 are intersected by longitudinal cavities 61 that accommodate the barrels 26 and extend from the end face 50*a*. The main body 50 also includes bearing supports 62 coaxial with the longitudinal cavities 61 to receive the distal end of the shaft 28 and provide support therefore. The port plates 29 are supported in recesses 31 in the sealing plate 52 so as to bear against the end face of the barrels 26. Bores 64 in the sealing plate are aligned with bores 62 to provide support for the shaft 28.

The motors 30, 32 are located in a bore 35 that extends from the end face 50*a* of the body 50 in to the transverse bores 60. The sleeves are captured by threaded ends in to the body 50 so as to be retained in the body and not impose significant axial loading on the joint between the end face 50*a* and end plate 50.

The valve blocks 54 56 include internal cavities 33 to accommodate the control valve 34. The actuator for the control valve 34 is located in a chamber 38 formed in the block 54 which also accommodates the control circuitry for the valve 34. The control circuitry for valve 34 also receives input from sensors 37, 39 determining the angular disposition of the swashplate 24 and the speed of rotation of the barrel 26. The sensors are located in a projection 41 and project toward the barrel assembly 26 so as to be positioned in the appropriate location upon assembly of the blocks 54, 56 to the body 50. The valve blocks 54, 56 further contain internal ducting to transfer fluid between the control valve 34 and the swashplate servo motors 30, 32.

In order to obtain conjoint rotation of the barrels of each machine, the outer surface of each of the barrels 26 is formed with a gear 80. The gear 80 meshes with an idler gear 82 carried by the body 50 and in engagement with the gears 80 of four adjacent machines. Accordingly, a single drive to one of the input shafts produces conjoint rotation in the same sense for each of the machines 12–22. Additional gears 82 are interposed between adjacent sets of barrels so that the array of machines may be increased beyond the 6 shown or may be reduced to 4 or 2 if desired. The drive may also be connected to the idler 82 to transfer the rotation in to each of the barrels.

Figure 3:
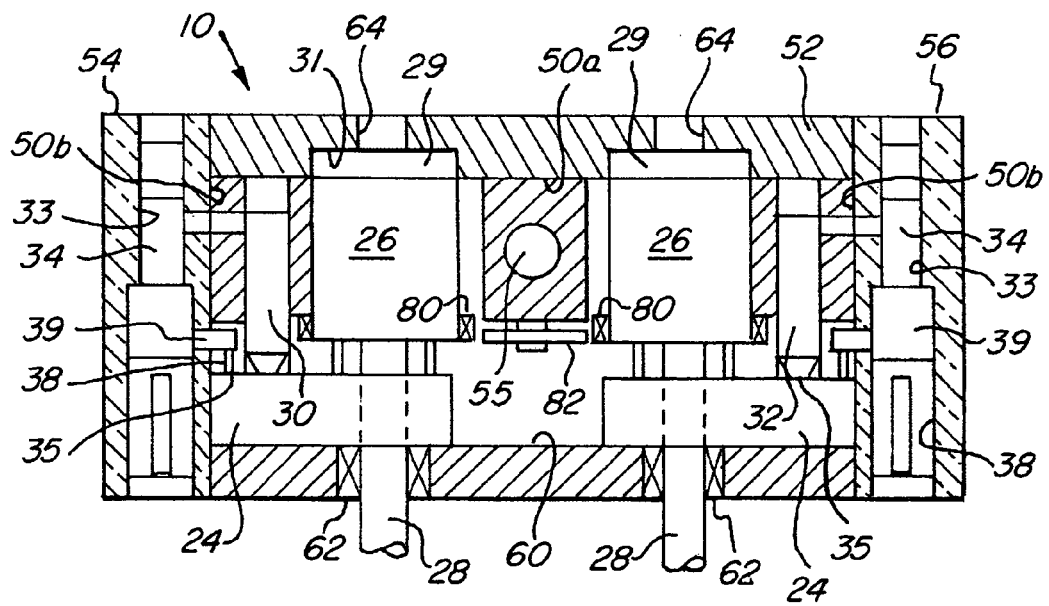
FIG. 3 is a view on the line III—III of FIG. 3.
Figure 4:
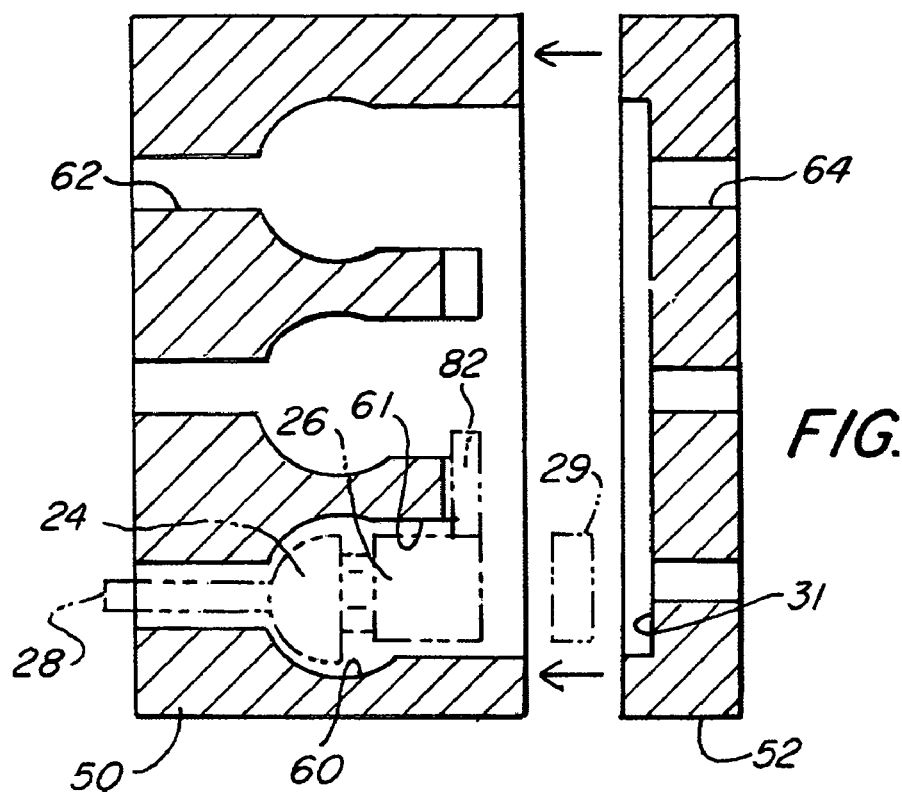
FIG. 4 is a view on the line IV—IV of FIG. 1.
Figure 5:
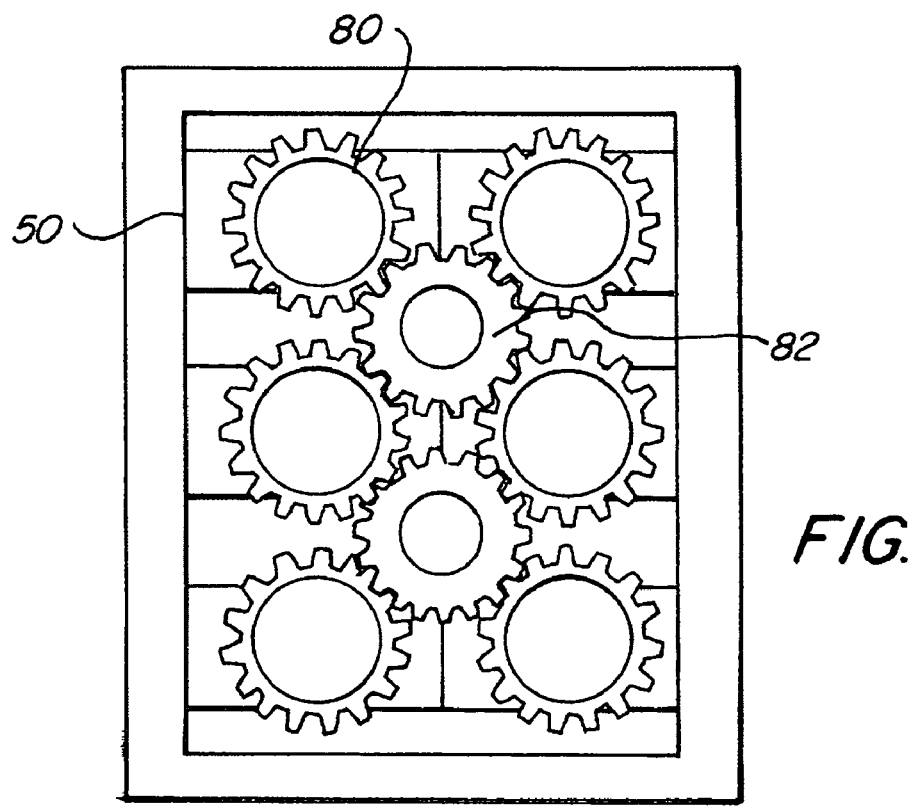
FIG. 5 is an end view of FIG. 1 with portions removed for clarity.

It will be seen therefore that a simply compact arrangement of multiple hydraulic machines is obtained with ease of manufacturer and with a single input drive to facilitate installation. It will be noted particularly from FIG. 3 that assembly of the components for each machine is relatively straightforward in that the swashplate may be slid through bores 60 and the shaft 28 and barrel assembly 26 inserted from the rear face 50a prior to attachment of the sealing block 52. The attachment of the sealing block 52 holds the port plates in location and provides a suitable location for connecting the supply and return conduits. After assembly of the rotating components, the valve blocks 54,56 can be secured by bolts or the like with the sensors extending in to the cavity provided by the bore 60 for engagement with the rotating components. The electrical control components are separated from the hydraulic fluid in the housing 37 and are readily accessible for testing and maintenance as required.

It will also be noted that the location of the motors 30, 32 is adjacent the valve block 54,56 to facilitate the supply of control fluid from the valve 34. The housing 10 thus provides an integrated support for a plurality of sets of rotating groups and avoids the need for separate discreet housings for each set. The provision of mechanical power to each of the rotating groups may be achieved in a simple and efficient manner from a single source permitting transfer of torque between each rotating group.

What is claimed is:

1. A hydraulic power supply system comprising a central block, a first bore extending between opposite faces thereof, a pair of second bores extending from an end face to intersect said first bore at spaced locations, a pair of swashplates located in said first bore and supported by the peripheral wall thereof, a pair of barrels rotatably mounted in said second bores and having axially slidable pistons bearing against said swashplates to reciprocate in said barrels as said barrel rotates and a drive to rotate said barrels in said bores.

2. A hydraulic power supply system according to claim 1 wherein said barrel is rotatably supported on a shaft extending through said block.

3. A hydraulic power supply system according to claim 2 wherein an end plate overlies said end face and is secured thereto to support said shaft.

4. A hydraulic power supply system according to claim 3 wherein a port plate is located between said end plate and said end face in each of said second bores.

5. A hydraulic power supply system according to claim 4 wherein a motor acts on respective ones of said swashplates to rotate said swashplate in said first bore and adjust the inclination thereof relative to said barrel.

6. A hydraulic power supply system according to claim 5 wherein said motors are located in bores extending from said end face to intersect said first bore.

7. A hydraulic power supply system according to claim 5 wherein said motors are controlled by a valve and said valves are located in a valve block located on each of the opposite faces of said central block.

8. A hydraulic power supply system according to claim 7 wherein each of said valve blocks includes a chamber to accommodate control circuitry.

9. A hydraulic power supply system according to claim 8 wherein sensors associated with said control circuitry project from said valve block for interaction with respective ones of said rotating groups.

10. A hydraulic power supply system according to claim 1 wherein said drive includes a gear train interconnecting said barrels.

11. A hydraulic power supply system according to claim 10 wherein said gear train includes a gear associated with each barrel and an idler gear interposed between adjacent barrels.

12. A hydraulic power supply system according to claim 11 wherein power is supplied to one of said drive shafts.

13. A hydraulic power supply system according to claim 11 wherein power is supplied to said idler gear.

14. A hydraulic power supply system according to claim 1 wherein a plurality of first bores are provided in said central block in spaced parallel relationship and each has a pair of second bores associated therewith.

15. A hydraulic power supply system according to claim 1 wherein an accumulator is formed in said central block.

* * * * *